United States Patent [19]

Aizawa et al.

[11] Patent Number: 4,482,802

[45] Date of Patent: Nov. 13, 1984

[54] TRANSACTION HANDLING SYSTEM

[75] Inventors: Kuniomi Aizawa, Seto; Yasuyoshi Ohyama, Owariasahi; Yasuo Okuma; Yoshio Okano, both of Seto; Youichirou Kitamura, Kashiwa, all of Japan

[73] Assignee: Hitachi, Ltd., Tokyo, Japan

[21] Appl. No.: 401,719

[22] Filed: Jul. 26, 1982

[30] Foreign Application Priority Data

Sep. 18, 1981 [JP] Japan .................. 56-147465

[51] Int. Cl.³ .............................................. H04Q 9/00
[52] U.S. Cl. ............................... 235/379; 235/380; 235/382; 340/825.34
[58] Field of Search ............... 235/379, 380, 381, 382, 235/385; 340/825.34

[56] References Cited

U.S. PATENT DOCUMENTS

| 3,308,439 | 3/1967 | Tink et al. | 235/379 |
| 3,833,885 | 9/1974 | Gentile et al. | 235/379 |
| 3,956,615 | 5/1976 | Anderson et al. | 235/379 |
| 4,017,835 | 4/1977 | Randolph | 340/152 R |
| 4,197,986 | 4/1980 | Nagata | 235/379 |
| 4,288,659 | 9/1981 | Atalla | 178/22.08 |
| 4,317,957 | 3/1982 | Sendrow | 178/22.08 |
| 4,321,672 | 3/1982 | Braun et al. | 235/379 |
| 4,375,032 | 2/1983 | Uchida | 235/380 |
| 4,386,266 | 5/1983 | Chesarek | 235/380 |
| 4,408,203 | 10/1983 | Campbell | 340/825.34 |

Primary Examiner—Gene Z. Rubinson
Assistant Examiner—Robert Lev
Attorney, Agent, or Firm—Antonelli, Terry & Wands

[57] ABSTRACT

In a system having a central unit, a terminal control equipment and terminal devices connected through communication lines, a transaction operation by an unauthorized terminal device is prevented.

Unauthorized use prevention information is registered to each of the terminal devices and the unauthorized use prevention information of the respective terminal devices is registered to the terminal control equipment. The terminal device, when it transmits transaction data to the terminal control equipment, transmits the unauthorized use prevention information of its own. The terminal control equipment compares the received unauthorized use prevention information with the registered unauthorized use prevention information of the corresponding terminal device and, if they are in a predetermined relation, permits the transaction operation.

7 Claims, 10 Drawing Figures

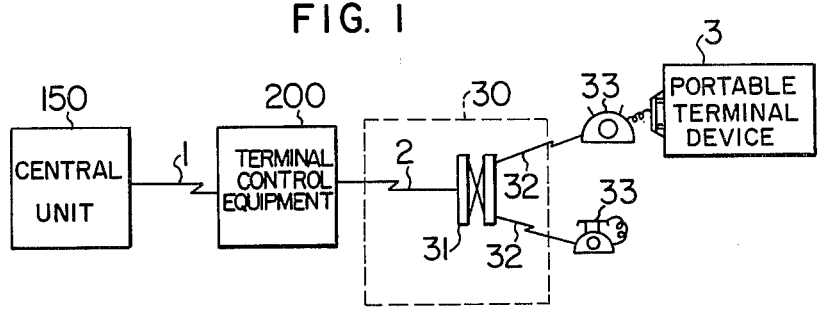
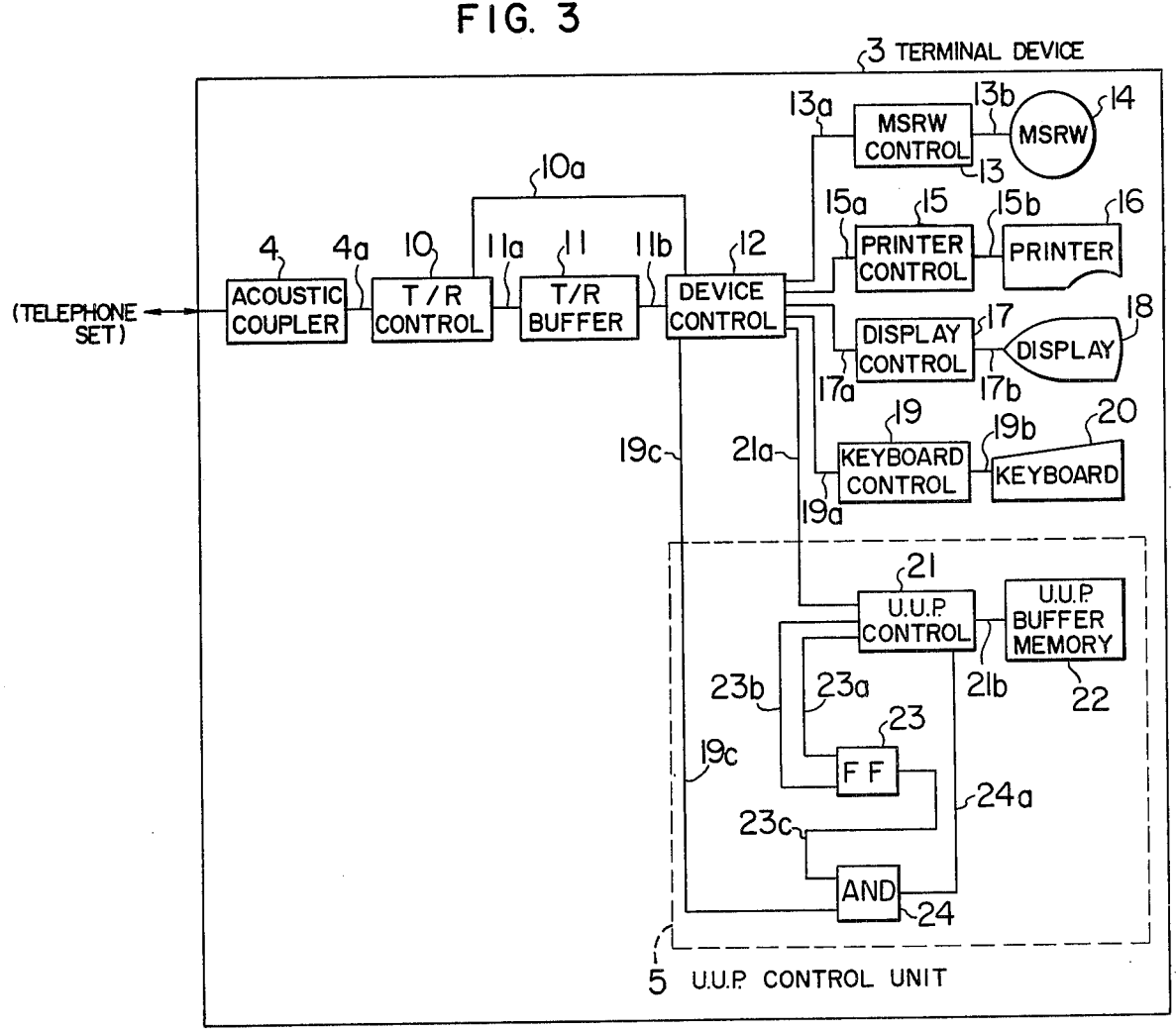

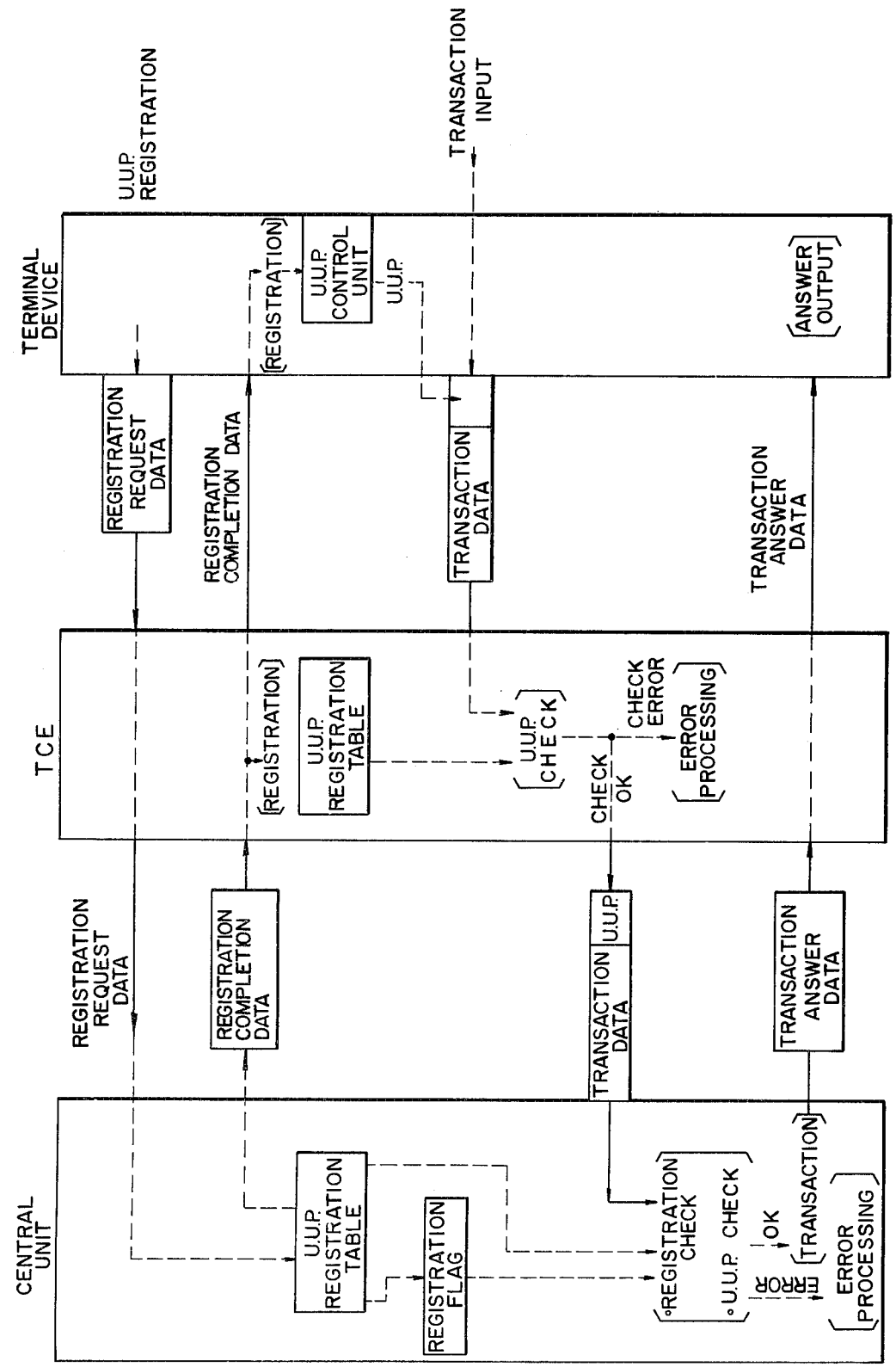

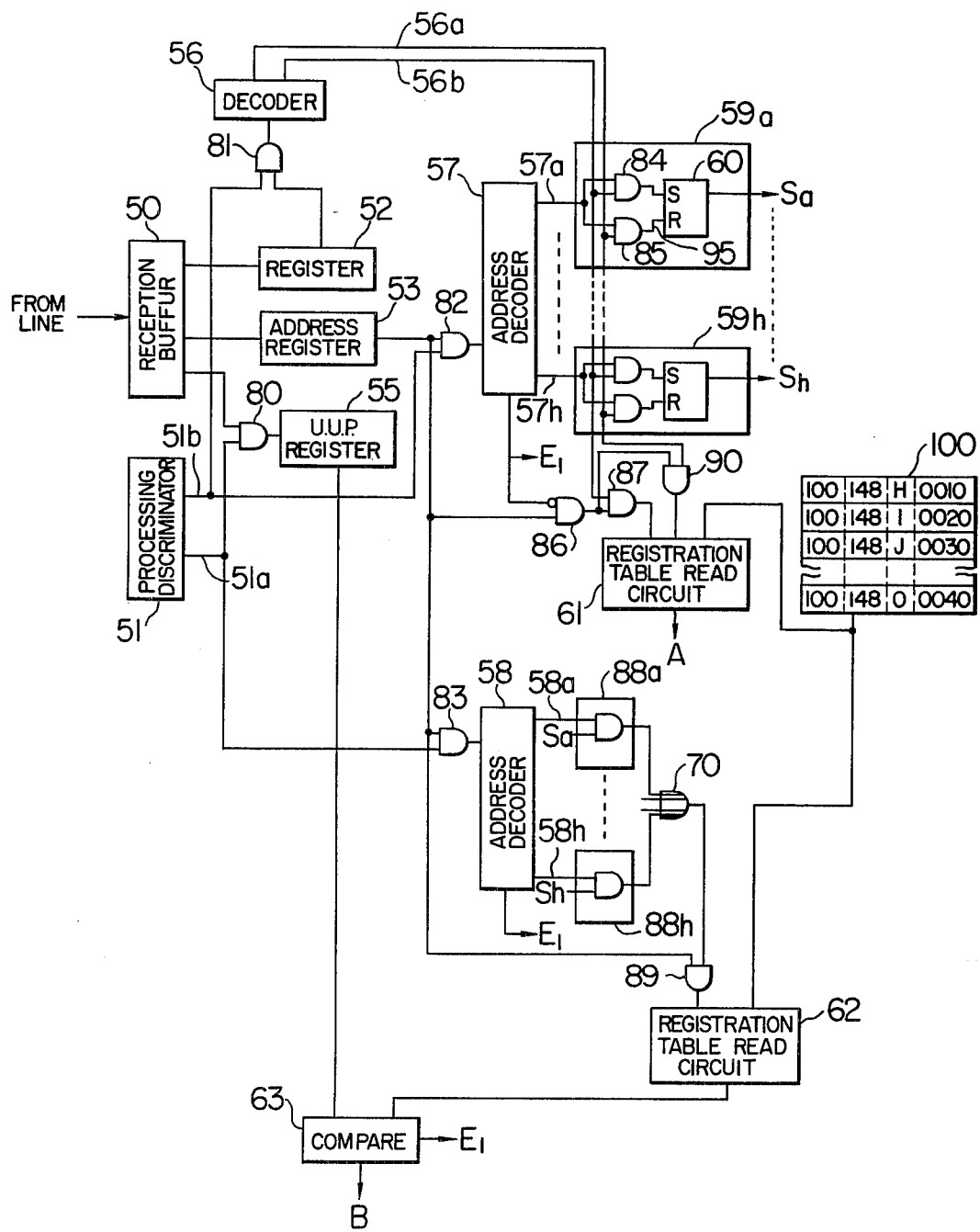
FIG. 5   CENTRAL UNIT

FIG. 6 CARD DATA
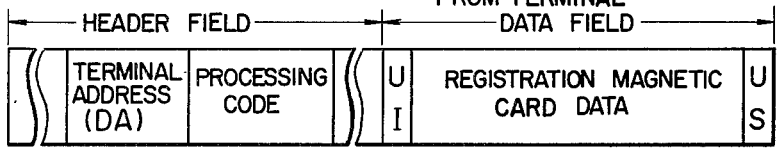
FIG. 7 REGISTRATION REQ. DATA FROM TERMINAL
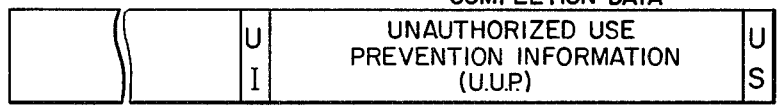
FIG. 8 REGISTRATION COMPLETION DATA
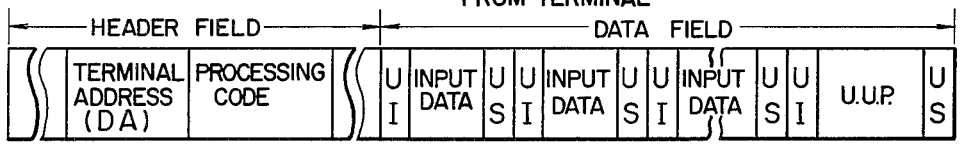
FIG. 9 TRANSACTION DATA FROM TERMINAL
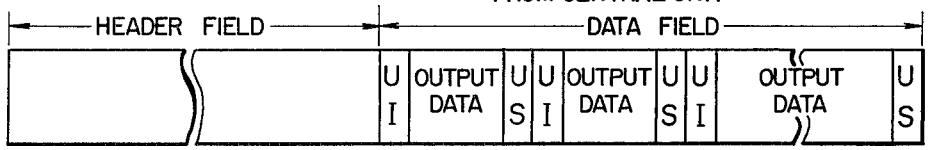
FIG. 10 ANSWER DATA OF TRANSACTION FROM CENTRAL UNIT

TRANSACTION HANDLING SYSTEM

CROSS-REFERENCE OF THE RELATED APPLICATIONS

This application relates to a U.S. Application Ser. No. 349,856 filed by Yoshio Okano et al. on Feb. 18, 1982 and assigned to the present assignee.

BACKGROUND OF THE INVENTION

1. Field of the Invention

The present invention relates to a transaction handling system for handling transactions by transmitting and receiving data by means of a central unit, terminal control equipment and terminal devices through communication lines or signal lines or by wireless communication.

2. Description of the Prior Art

In a prior art automatic cash dispenser (CD) of a banking system, in order to check to see if a user who wants to effect a transaction by use of the CD is a valid user, a magnetic card having a secret code specified by a customer or an account number is issued to the customer when he or she registers a new account. Then, when the customer tries to effect a transaction by use of the CD, the customer inserts the magnetic card into the CD and keys in the secret code to the CD, and the entry of transaction data is permitted only if the keyed-in secret code and the secret code recorded on the magnetic card are the same, thereby to identify that the user of the CD is a valid user who knows the secret code recorded on the magnetic card. Many other unauthorized use prevention systems for checking the validity of the user of the machine by using a secret code have been used.

In the prior art unauthorized use prevention system of the type commonly used, a check is made to see if an operator who wants to effect a transaction by use of a stationary machine such as a CD is a valid operator who knows a predetermined key word to prevent an unauthorized transaction.

In recent years, a portable terminal device which is carried by a bank solicitor to a customer site and is connected to a central unit from the customer site through a telephone line to transmit data to permit a transaction has been put into practice. It may be possible that such a device can be stolen and an unauthorized transaction carried out by the use of a stolen device, or an unauthorized transaction may be carried out by a device not permitted for use in a particular system. For example, a portable terminal device owned by a bank B may be connected to a central unit of a bank A which is designed to effect a transaction by connecting to only the portable terminal devices owned by the bank A, or a microcomputer expert may build a device having the same performance as the portable terminal device owned by the bank A and connect it to the central unit of the bank A to effect an unauthorized transaction. Consequently, unauthorized use prevention for a system which uses a portable terminal device connected to the central unit through a public communication line to effect a transaction cannot be attained by merely checking the validity of the operator who operates the machine by the secret code like the unauthorized use prevention system for the CD.

SUMMARY OF THE INVENTION

It is an object of the present invention to provide a transaction handling system which limits the terminal devices that can effect a transaction to prevent a transaction by an unauthorized terminal device.

In accordance with a feature of the present invention, unauthorized use prevention information is previously registered in a terminal device used for the transaction, and when transaction data is to be transmitted from the terminal device to terminal control equipment, the unauthorized use prevention information registered in the terminal device is transmitted together with the transaction data. The terminal control equipment checks to see if the received unauthorized use prevention information coincides with or has a predetermined relation to the unauthorized use prevention information of the corresponding terminal device registered in that terminal device and permits the transaction on the basis of the transaction data only if the check result is OK. In this manner, the terminal device which is permitted to effect the transaction is identified and the transaction by an unauthorized terminal device is prevented.

BRIEF DESCRIPTION OF THE DRAWINGS

FIG. 1 shows a configuration of one embodiment of the present invention, which comprises a central unit, a terminal control equipment and a terminal device.

FIG. 2 shows a job handling sequence chart for the transaction carried out by the embodiment of FIG. 1.

FIG. 3 shows a block diagram of the terminal device.

FIG. 5 shows a block diagram of portions of the central unit which are pertinent to the present invention.

FIG. 6 shows a data format of a magnetic card used to request the transmission of unauthorized use prevention information from the terminal device to the central unit.

FIGS. 7, 8, 9 and 10 show data formats transmitted and received by the central unit, the terminal control unit and the terminal device.

DESCRIPTION OF THE PREFERRED EMBODIMENTS

Figure 4:
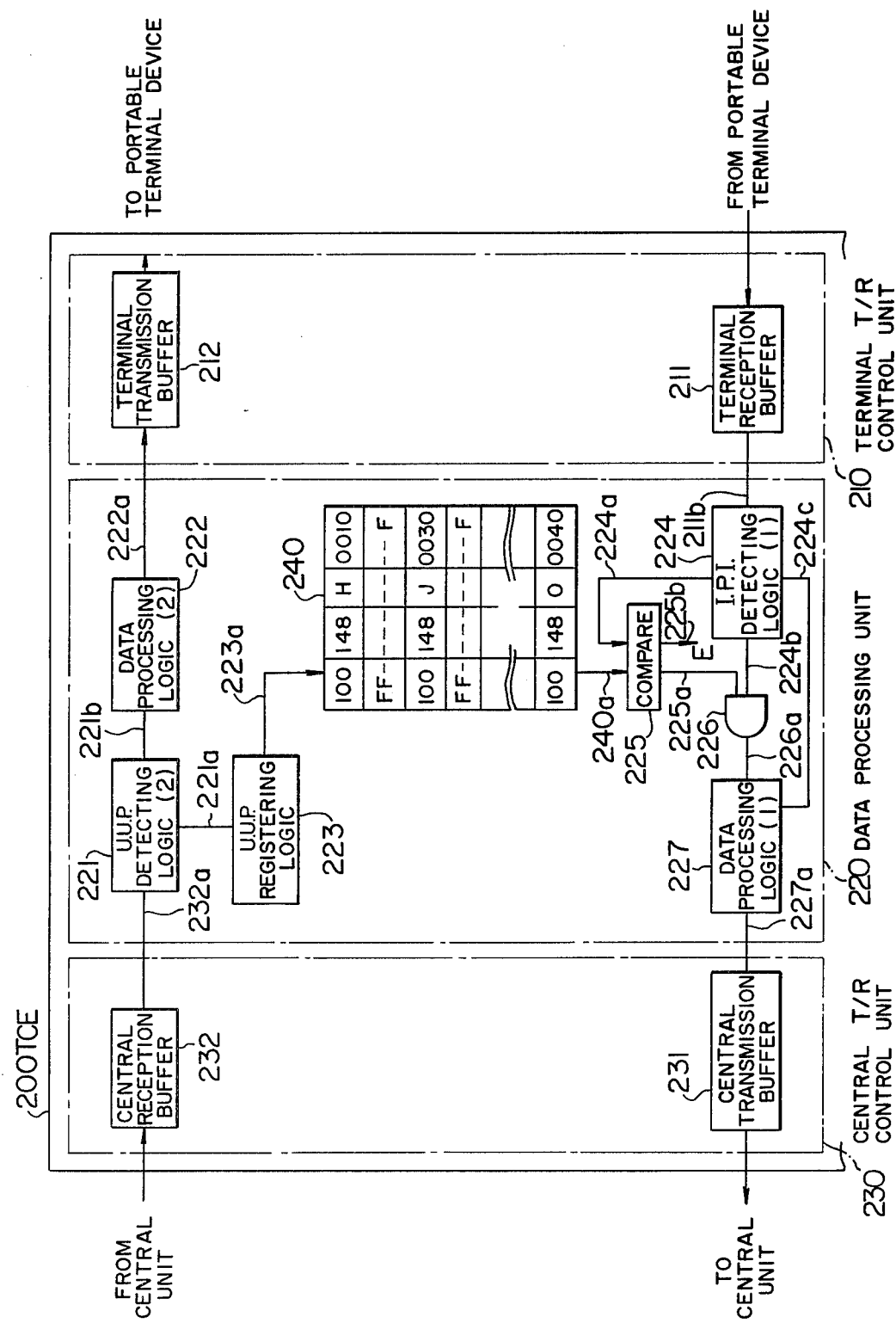
FIG. 4 shows a block diagram of portions of the terminal control equipment which are pertinent to the present invention.

FIG. 1 shows one embodiment of the present invention, in which a central unit, terminal control equipment (TCE) and a portable terminal device are interconnected. In FIG. 1, the TCE is inserted between the portable terminal device and the central unit in order to manage the transactions by the portable terminal devices of respective branch offices. In FIG. 1, the TCE 200 and the portable terminal device 3 are interconnected by a public network (telephone network) 30 through a telephone set 33. The portable terminal device 3 is carried to a transaction site, and when a transaction is required the telephone set 33 at the transaction site is dialed to call the TCE 200 and a handset of the telephone set 33 is set onto an acoustic coupler (to be described later) of the portable terminal device 3 to connect the portable terminal device 3 to the TCE 200. Thus, data transmission and reception between the TCE 200 and the portable terminal device 3 are permitted through the public network 30. Numeral 2 denotes a public communication line, numeral 31 denotes a switching exchange and numeral 32 denotes a subscriber's telephone line. On the other hand, the central unit 150 and the TCE 200 are interconnected through a specified communication line 1. When the central unit 150 and the TCE 200 are ready to handle jobs, a line link is always established to allow the data transmission and reception in a predetermined sequence.

The portable terminal device 3 is a job data input-/output device having a function of transmitting data entered by an input unit thereof to the TCE 200 and a function of outputting data received from the The TCE 200 to an output unit thereof. Details of the portable terminal device 3 will be described later.

TCE 200 receives the data transmitted from the central unit 150 directed to the portable terminal devices, extracts the unauthorized use prevention information from the received data, stores the information for each portable terminal device, checks and converts the contents of the transaction data and sends it out to the portable terminal device 3 specified by the central unit 150. When the TCE 200 receives the transaction data from the portable terminal device 3, it compares the unauthorized use prevention information in the received data with the corresponding injustice prevention information of that portable terminal device (the corresponding information of that portable terminal device received from the central unit 150), and transmits the transaction data to the central unit 150 only when the check result is OK. Details of the operation of the TCE 200 will be described later.

The central unit 150 receives the data from the TCE 200 and sends out the unauthorized use prevention information to be registered to the portable terminal device 3 and the TCE 200 in accordance with the received data content, checks the unauthorized use prevention information in the received data, and if the check result is OK, effects the transaction for the transaction data in the received data, and sends out transaction answer data to the portable terminal device which transmitted the transaction data. As will be described later, the central unit 150 has an unauthorized use prevention information registration table which stores the unauthorized prevention information to be registered in the portable terminal devices for each of the terminal addresses of the portable terminal devices which the central unit permits to enter the transaction data.

A job handling sequence and the operations of the respective units when a job is handled by the system of FIG. 1 comprising the central unit, the terminal control equipment and the portable terminal device will now be explained. FIG. 2 shows a sequence chart therefor.

In the present system, before the portable terminal device which is to be carried to the transaction site and through which the transaction data is to be entered and outputted at the transaction site is brought out from an office, such as a branch office, the unauthorized use prevention information is registered in the office. The unauthorized use prevention information is registered in the following manner. A registration magnetic card which is managed by a management organization is read by a magnetic stripe reader/writer (MSRW) of the portable terminal device, a telephone set in the office is dialed to call the TCE, the handset of the telephone is set unto the acoustic coupler of the portable terminal device, and after a line has been connected, a transmission key of the portable terminal device is depressed. Thus, the portable terminal device edits the data read by the MSRW into a transmission format and sends it to the central unit through the TCE.

FIG. 6 shows a data format of the magnetic card and FIG. 7 shows a data format of registration request data transmitted from the portable terminal device to the central unit via the TCE. In FIG. 6, when a registration request code is "T", it represents a terminal registration card, and when it is other than "T", it represents a transaction card. When the type of data code is "1", it represents an an unauthorized use prevention information registration request, and when it is "0", it represents an unauthorized use prevention information delete request. The transaction card is used in the process of the transaction as described later. In the registration request data shown in FIG. 7, a header field contains a terminal address uniquely allotted to each of the portable terminal devices and a processing code (T) indicating the registration request. UI denotes a Unit Identification code which indicates a magnetic stripe reader/-writer unit. US (unit separator) denotes a boundary the data. The same symbols are used in FIGS. 8-10.

When the TCE receives the data having T in the processing code (registration request data) shown in FIG. 7 from the portable terminal device, it passes the data to the central unit.

When the central unit receives the registration request data from the portable terminal device via the TCE, it identifies the registration request from the processing code in the received data and decodes the terminal address, sets a registration flag corresponding to that terminal device, reads out the information (unauthorized use prevention information) corresponding to that terminal address registered in the unauthorized use prevention information table, and transmits registration completion data edited into the format shown in FIG. 8 to the portable terminal device which transmitted the registration request data, via the TCE. In FIG. 8, UI indicates the output data to an unauthorized use prevention information controller.

When the TCE receives the registration completion data shown in FIG. 8 from the central unit, it identifies the unauthorized use prevention information by the UI code in the received data and registers it to an unauthorized use prevention information area (unauthorized use prevention information registration table) for the corresponding terminal device, and transmits the received registration completion data to the portable terminal device specified by the central unit.

The portable terminal device identifies the unauthorized use prevention information by the UI code in the received registration completion data, stores the unauthorized use prevention information in an unauthorized use prevention information buffer memory, and sets the unauthorized use prevention information registration flag.

The registration process has thus been completed and the portable terminal device is ready for use as the transaction data input/output device. Then, the portable terminal device is permitted to be carried to the transaction site to effect the transaction.

The transaction operation is now explained in brief. The portable terminal device is carried to the transaction site and necessary data is entered by the input unit of the terminal device and the terminal device is connected to the TCE 200 as shown in FIG. 1. When the transmission key on the keyboard of the portable terminal device is then depressed, the portable terminal device edits the input data while affixing the UI code and the US code for each input unit, and checks the unauthorized use prevention information registration flag, and if it is on, it delimits the content of the unauthorized use prevention information buffer memory by the UI code and the US code like the input data, edits it into the transaction data transmission format and transmits it to the TCE as the transaction data. FIG. 9 shows transaction data format. A header field thereof includes a terminal address and a processing code (D) indicating the transaction request, like the terminal registration request data shown in FIG. 7. When the TCE receives the transaction data, it identifies the transaction operation from the transaction code D in the received data, decodes the terminal address of the terminal which transmitted the data, reads out unauthorized use prevention information for the portable terminal device which requested the transaction from the unauthorized use prevention information table, checks to see if it is equal to the unauthorized use prevention information in the received data and transmits the received transaction data to the central unit only if the check result is OK.

When the central unit receives the transaction data through the TCE, it identifies the transaction operation from the processing code D of the header field of the received data, decodes the terminal address of the terminal which transmitted the transaction data, checks the registration flag to determine if the portable terminal device which requested the transaction is a registered terminal device, and if it is a registered terminal, compares the unauthorized use prevention information in the received data to see if it is equal to the unauthorized use prevention information in the unauthorized use prevention information table of the central unit, and if the result of comparison is equal, carries out the transaction for the received data, prepares transaction answer data, edits the transaction answer data into the format shown in FIG. 10, and transmits the transaction answer data to the portable terminal device which transmitted the transaction data, through the TCE. The TCE passes the data received from the central unit to the terminal device. When the portable terminal device receives the transaction answer data, it identifies one of the output units of the terminal by the UI code in the received data and supplies the received data to the output unit. Thus, the transaction operation is completed.

Specific constructions of the portable terminal device, the terminal control equipment (TCE) and the central unit now will be explained.

FIG. 3 shows a construction of the portable terminal device. In FIG. 3, the MSRW 14 uses the magnetic card (MC) having a magnetic stripe (MS) applied thereon as a magnetic record medium, and has a guide groove along which the MC is manually scanned relative to a magnetic record information read/write head. An MSRW control circuit 13 controls the read/write operation of the magnetic record information. When the MC is scanned along the scan guide groove, the MSRW control circuit 13 reads the magnetic record information, stores it in a buffer memory in the MSRW control circuit 13 and transmits it to a device control circuit 12. When the MC is scanned along the scan guide groove while the MSRW control circuit 13 stores the write magnetic information in the buffer memory in response to a write instruction from the device control circuit 13, the MSRW control circuit 13 writes the stored write magnetic information onto the MC.

A printer 16 prints characters on a print medium and has a print head, a print head drive mechanism and a print medium loading mechanism. When a printout instruction and print data are supplied to a printer control circuit 15 from the device control circuit 12, the printer 16 is operated under the control of the printer control circuit 15 to drive the print head to print characters on the print medium.

A keyboard 20 is provided with various keys necessary to enter the transaction data such as data input keys and a transmission key. When a key on the keyboard 20 is depressed, a code corresponding to the depressed key is generated by a keyboard control circuit 19 and transmitted to the device control circuit 12.

A display 18 displays operation guidance and monitor display for the input data. When a display control circuit 17 receives a display instruction, a designation of a display address and display data from the device control circuit 12, the display 18 displays the received data under the control of the display control circuit 17.

An unauthorized use prevention information control unit 5 comprises an unauthorized use prevention information control circuit 21, an unauthorized use prevention information buffer memory 22, an unauthorized use prevention information registration flag (flip-flop) 23 and an AND circuit 24. The buffer memory 22 is a rewritable buffer memory which stores the unauthorized use prevention information sent from the control circuit 21. The control circuit 21 controls the registration, deletion and readout of the unauthorized use prevention information and receives the unauthorized use prevention information sent from the device control circuit 12 and loads the received information into the buffer memory 22 when the registration is instructed, and it turns on a signal on a signal line 23a to turn on (registered state) a signal on a signal line 23c of the flip-flop 23. When the deletion of the unauthorized use prevention information is instructed (when the content of the unauthorized use prevention information is all "0"), the control circuit 21 turns on a signal (unregistered state) on a signal line 23b to turn off the signal on the signal line 23c of the flip-flop 23. The AND circuit 24 receives inputs from the output signal line 23c of the flip-flop 23 and a signal line 19c which produces a signal when the device control circuit 12 receives the transmission key code from the keyboard control circuit 19, and when it receives the signals from both input signal lines, it sends out an unauthorized use prevention information read instruction signal to the unauthorized use prevention information control circuit 21 through a signal line 24a. When the control circuit 21 detects the presence of the signal on the signal line 24a, it reads out the content of the buffer memory 22 and sends it to the device control circuit 12.

A transmission/reception control circuit 10 controls the send-out of the data loaded in a transmission/reception reception buffer 11 to the acoustic coupler 4 in response to the detection of the transmission instruction signal sent from the device control circuit 12 via a signal line 10a, and also controls the loading of the data sent out from the acoustic coupler 4 into the transmission/reception buffer 11 and the reporting of the receipt of the data to the device control circuit 12 through the signal line 10a.

The acoustic coupler 4 has a loading mechanism for a handset of a telephone set and converts a signal received from a line through the telephone set to an internal signal used by the portable terminal device 3, and controls the send-out of the converted signal to the transmission/reception control circuit 10. It also receives the signal sent from the transmission/reception control circuit 10, converts it to a type of line signal and controls the send-out of the converted signal to the communication line 2.

The device control circuit 12 controls the overall input/output units. When data is entered from one of the input units, the device control circuit 12 holds the data and edits it into a display format for the display control circuit 17 and causes the display 18 to display the data. When the transmission key on the keyboard 20 is depressed and the device control circuit 12 receives the transmission key code from the keyboard control circuit 19 through the signal line 19a, the device control circuit 12 adds to the held input data the UI code identifying the input unit and the US code indicating the delimitation of the data for each input item, and exits the data into the transmission format. The device control circuit 12 also produces a signal on the signal line 19c to read out the content of the buffer 22 of the unauthorized use information control unit 5, and adds the read data to the edited data. The device control circuit 12 sets the registration code T read from the card into the header field if input data from the registration request card is present. While, the circuit 12 sets the transaction code D extracted therefrom in the processing code of the header field as shown in FIG. 9 if input data from the transaction card is present. It also loads the device address (DA) of its terminal address into the transmission/reception buffer 11 and instructs the transmission to the transmission/reception control circuit 10 through the signal line 10a. In the above-mentioned case, data corresponding to the code D may be input by a keyboard 20 instead of the card insertion.

On the other hand, when the data is transmitted from the central unit through the TCE, the transmission/reception control circuit 10 identifies the beginning of the data by a flag character added to the beginning of the data (which indicates the beginning or the end of the data and comprises a code not used as a data code), checks the subsequently received data character by character to determine if it is equal to the flag character, and if the flag character and the received data code are not equal, the transmission/reception control circuit 10 sequentially transfers the received data codes to the transmission/reception buffer 11. When the received data code is equal to the flag character, the transmission/reception control circuit 10 stops the transfer of the received data code and reports the receipt of the data to the device control circuit 12 through the signal line 10a. The received data loaded in the transmission/reception buffer 11 is either the registration completion data shown in FIG. 8 or the transaction completion data shown in FIG. 10.

When the device control circuit 12 receives the report of the data receipt from the transmission/reception control circuit 10, it supplies the data between the UI code and the US code following the header field of the data loaded in the transmission/reception buffer 11 as output data. The UI code in the received data specifies the output unit for the received data and predetermined codes are allotted to the respective output units including the MSRW 14, the printer 16, the display 18 and the unauthorized use prevention information control unit 5. The device control circuit 12 decodes the UI code in the received data, and if the UI code specifies the MSRW 14, it sends out the data following the UI code to the signal line 13a until it detects the US code. When the UI code specifies the printer 16, it sends out the data between the UI code and the US code to the signal line 15a, when the UI code specifies the display 18 it sends out the data to the signal line 17a, and when the UI code specifies the injustice prevention information control unit 5, it sends out the data to the signal line 21a. In this manner, the writing of the data to the magnetic record medium, the printing of the data, the display of the data, the registration of the injustice prevention information and the setting of the injustice prevention information/unregistered state are carried out.

FIG. 4 shows a block diagram of a portion of the TCE 200 which is pertinent to the present invention. The TCE 200 has a terminal transmission/reception control unit 210, a central transmission/reception control unit 230 and a data processing unit 220. The terminal transmission/reception control unit 210 controls the transmission/reception of the data transmitted from the portable terminal device and loads the received data into a terminal reception buffer 211. When it receives the data from the data processing unit 220 into a terminal transmission buffer 212, it transmits the content of the terminal transmission buffer 212 to the portable terminal device.

The central transmission/reception control unit 230 controls the transmission/reception of the data to and from the central unit. It controls the reception of the data transmitted from the central unit and loads the received data into a central reception buffer 232. When it receives the data from the data processing unit 220 into a central transmission buffer 231, it transmits the content of the central transmission buffer 231 to the central unit.

The data processing unit 220 comprises a processing circuit for processing the data received from the central unit having a data processing logic (2) 222, an unauthorized use prevention information detecting logic (2) 221 and an unauthorized use prevention information registering logic 223, a data processing circuit for processing the data received from the portable terminal device having a data processing logic (1) 227, an AND circuit 226, a compare circuit 225 and an unauthorized use prevention information detecting logic (1) 224, and an unauthorized use prevention information registration table 240 which stores the unauthorized use prevention information for each of the terminal addresses of the portable terminal devices connected. The table 240 is initially filled with hexadecimal codes "FF".

When the data is received into the terminal reception buffer 211 from the portable terminal device through the public communication line (telephone network) connected to the TCE 200, the unauthorized use prevention information detecting logic (1) 224 decodes the processing code in the header field of the received data, and if the processing code is the registration code T (the received data is the registration request data as shown in FIG. 7 in this case), it transfers the received data to the data processing logic (1) 227 through a signal line 224c. When the registration code is other than the registration code T (the received data is the transaction data as shown in FIG. 9 in this case), it identifies the unauthorized use prevention information from the UI code in the received data, transfers the unauthorized use prevention information field and the terminal address field to the compare circuit 225 through the signal line 224a, and transfers the received data to the AND circuit 226 through a signal line 224b. When the compare circuit 225 receives the unauthorized use prevention information and the terminal address from the signal line 224a, it reads out the content of the registration table 240 corresponding to the input terminal address, through a signal line 240a, compares it with the unauthorized use prevention information in the received data, and if they are equal, it produces a signal on a signal line 225a. If they are not equal, it produces an error signal E on a signal line 225b. The error signal E is supplied to an error processing logic (not shown). If the error signal E is on, the error processing is carried out by the error processing logic. The AND circuit 226 receives inputs from the signal line 225a and the signal line 224b. If the signal on the signal line 225a is on, it transfers the content of the terminal reception buffer 211 on the signal line 224b to the data processing logic (1) 227. When the data processing logic (1) 227 receives the data received from the portable terminal device, it processes the content of the data such as code conversion. After the predetermined processing, it transfers the data (without modifying the data format) to the central transmission buffer 231 through a signal line 227a. At this time, the output signal 225a of the compare circuit 225 is reset (not shown). When the data is loaded into the central transmission buffer 231, the content of the central transmission buffer 231 is transmitted to the central unit under the control of the central transmission/reception control unit 230.

In this manner, the registration request data in the data received by the TCE 200 from the portable terminal device and the transaction data having the unauthorized use prevention information added thereto which corresponds to the unauthorized use prevention information for that terminal device stored in the table 240 are transmitted to the central unit.

On the other hand, the data transmitted from the central unit through the communication line is loaded into the central reception buffer 232 under the control of the central transmission/reception control unit 230. When the data is loaded into the central reception buffer 232, the detecting logic (2) 221 decodes the UI code in the data, and when it detects the UI code indicating the unauthorized use prevention information, it extracts the unauthorized use prevention information and transfers the terminal address (loaded in the header field by the central unit) and the unauthorized use prevention information in the received data and the terminal address to the registering logic 223 through a signal line 221a. It also transfers the received data to the data processing logic (2) 222 through the signal line 221b. When the logic 223 receives the terminal address and the unauthorized use prevention information, it loads (registers) the received information into an area of the table 240 corresponding to the input terminal address. The data processing logic (2) 222 checks the data content and carries out a predetermined data processing such as code conversion, and transfers the processing result (without modifying the data format in the present embodiment) to the terminal transmission buffer 212 through the signal line 222a. When the data is loaded into the terminal transmission buffer 212, the content of the buffer 212 is transmitted to the portable terminal device under the control of the terminal transmission/reception control unit 210.

In this manner, the unauthorized use prevention information of the data received from the central unit is registered in the table 240 for each terminal address and the processing result for the received data is transmitted to the portable terminal device.

FIG. 5 shows a block diagram of a portion of the central unit which is pertinent to the present invention. A reception buffer 50 stores the data transmitted from the TCE. A processing discrimination circuit 51 extracts the processing code of the header field of the received data and decodes it. When the processing code is the registration code T, it sends out a signal on a signal line 51b, and when the processing code is the transaction code D, it sends out a signal on a signal line 51a. When a registration magnetic card data is included in the received data, a register 52 extracts a data type code in the data and holds it. An address register 53 extracts and holds the terminal address of the header field of the received data.

An AND circuit 81 is opened when the signal is present on the signal line 51b and the data type code is held in the register 52 to send the content of the register 52 to a decoder 56. When the data type code is supplied to the decoder 56 through the AND circuit 81, the decoder 56 decodes the data type code and when it is "1" (indicating an unauthorized use prevention information registration request), it sends out a signal to a signal line 56b, and when it is "0" (indicating the unauthorized use prevention information deletion request), it sends out a signal to a signal line 56a.

When the terminal address is held in the address register 53 and the signal is present on the signal line 51b, an AND circuit 82 is opened to send the content of the address register 53 to an address decoder 57. When the address decoder 57 receives the terminal address data through the AND circuit 82, it decodes the terminal address and sends out a signal to an output line corresponding to the input terminal address. In the present embodiment, when the terminal address is 1, 2 or 8, the signal is produced on a signal line 57a, 57b or 57h, respectively. When the input terminal address is invalid (the terminal address is other than 1-8 in the present embodiment), an error output signal $E_1$ is produced at the output of the address decoder 57.

Registration flags 59 each comprise two AND circuits 84 and 85 and a flip-flop 60. They are provided one for each of the output signal lines of the address decoder 57, that is, one for each of the data transmitting terminal addresses. The signal lines of the address decoder 57 are connected to the AND circuits 84 and 85 of the respective registration flags 59. The AND circuit 84 receives the inputs from one of the output signal lines of the address decoder 57 and the signal line 56b, and when the signals are present on both lines, it produces a signal to a set terminal of the flip-flop 60.

The AND circuit 85 receives the input from the same one of the output signal lines of the address decoder 57 as the AND circuit 84 and the signal line 56a, and when the signals are present on both lines, it produces a signal to a reset terminal of the flip-flop 60.

The flip-flop 60 produces an output signal when the signal is applied to the set terminal, and produces no output signal when the signal is applied to the reset terminal. When the registration request data is received in the reception buffer 50, the output signal $S_a$–$S_h$ of the registration request flag 56 corresponding to the terminal address of the terminal device which transmitted the registration request data is produced or not produced depending on the data type code in the registration request data. If the data type code is "1" (indicating the setting of the unauthorized use prevention information to the terminal device), the registration request flag 59 produces the output to indicate that the unauthorized use prevention information of the corresponding terminal device is valid, and if the data type code is "0" (indicating the deletion of the unauthorized use prevention information of the terminal device), the registration request flag 59 produces no output to indicate that the unauthorized use prevention information of the corresponding terminal device is invalid.

An AND circuit 86 receives the output of the address register 53 and an inverted version of the error output signal $E_1$ from the address decoder 57. It is opened when the terminal address is held in the address register 53 and the error output signal $E_1$ of the address decoder 57 is absent to gate the content of the address register 53. An AND circuit 87 receives the output of the AND circuit 86 and the signal on the signal line 56b, and when the signals are present on both lines it supplies the terminal address to a registration table read circuit 61.

An AND circuit 90 receives the output of the AND circuit 86 and the signal on the signal line 56a, and when the signals are present on both lines, it supplies the terminal address to the registering table read circuit 61 from the address register 53. When the registration table read circuit 61 receives the terminal address from the AND circuit 87 (when the unauthorized use prevention information is to be registered to the terminal device), it reads out the unauthorized use prevention information for the input terminal address from the registration table 100 and supplies it as an output data A. When it receives the terminal address from the AND circuit 90 (when the unauthorized use prevention information of the terminal device is to be deleted), it does not access to the registration table 100 but generates a code having as many zeros as the number of data bits of the unauthorized use prevention information and produces it as the output data A. The output data is sent out to the line as the terminal registration completion data shown in FIG. 8.

The flip-flop 60 of the registration flag 59 can be reset through the signal line 95. A signal is supplied to the signal line 95 from a keyboard (not shown) arranged in the central unit. The registration table 100 can register therein specific information (unauthorized use prevention information) one for each terminal address and it may be a buffer memory which stores therein the predetermined unauthorized use prevention information.

The construction of the unauthorized use prevention information registration system of the central unit has thus far described.

The construction of the transaction system is now described.

An AND circuit 80 is opened when the unauthorized use prevention information is included in the data received in the reception buffer 50 and the signal is present on the output signal line 51a of the processing discrimination circuit 51 to sends out the unauthorized use prevention information in the received data to register 55, which holds the unauthorized use prevention information in the data received through the AND circuit 80.

An AND circuit 83 receives the output of the address register 53 and the signal on the output signal line 51a of the processing discrimination circuit 51, and it is opened when the terminal address is set to the address register 53 and the signal is sent out to the signal line 51a to gate the terminal address to an address decoder 58. The decoder 58, identical to the address decoder 57, receives the terminal address and produces an output signal corresponding to the input terminal address on one of signal lines 58a–58h. When the terminal address is 1, 2 or 8, it produces the signal on the signal line 58a, 58b or 58h, respectively. When the input terminal address is invalid (the terminal address is other than 1–8 in the present embodiment), it produces an error output signal $E_1$.

AND circuits 88 are provided one for each of the output signal lines of the address decoder 58 and each receives an input from one of the output signal lines of the address decoder 58 and an input from one (corresponding to the terminal address) of the output signals ($S_a$–$S_h$) of the registration flags 59 which are provided one for each terminal address, and it is opened when both input signals are present to produce an output signal. An OR circuit 70 receives the output signals of the respective AND circuits 88 and it is opened when one of the signals is present to gate the signal. An AND circuit 89 receives the output signals of the OR circuit 70 and the output signal of the address register 53, and it is opened when both signals are present to gate the terminal address of the address register 53 to a registration table read circuit 62.

When the registration table read circuit 62 receives the terminal address through the AND circuit 89, it reads out the information of the table 100 corresponding to the input terminal address and sends it to a compare circuit 63. When the compare circuit 63 receives the unauthorized use prevention information from the registration table read circuit 62, it reads out the content of the register 55, compares the data from the register 55 with the data from the registration table read circuit 62, and when they are equal, it produces an output signal B, and when they are not equal, it produces an error output signal $E_1$.

The output signal B from the compare circuit 63 is used to start the transaction operation. When the output signal B is present, the transaction operation is carried out for the received data and the operation result is transmitted back as transaction answer data to the terminal device which transmitted the transaction data. On the other hand, when the terminal address is the transaction data is invalid, the error signal $E_1$ is produced from the address decoder 58, and if the registration flag 59 corresponding to the terminal device which transmitted the transaction data is invalid or the unauthorized use prevention information in the transaction data is not equal to the information read from the registration table 100, the error signal $E_1$ is produced from the compare circuit 63. If an error signal is output from address decoder 57 or 58 or compare circuit 63, the transaction operation is inhibited and an error processing operation is carried out. In this case, the data is not transmitted to the terminal device which transmitted the transaction data.

The details of the operations of the central unit, the TCE and the portable terminal device have thus been described. The central unit registers the specific information (unauthorized use prevention information) held one for each of the portable terminal devices, to the TCE and the portable terminal devices, and when the portable terminal device transmits the transaction data to the central unit, it also transmits the registered unauthorized use prevention information, and when the TCE and the central unit receive the transaction data, they check to see if the unauthorized use prevention information has been registered to the terminal device which transmitted the transaction data and if the received unauthorized use prevention information is equal to the information stored in the registration table in the central unit corresponding to that terminal device. Accordingly, the present invention offers the following advantages:

(a) Since the transaction is permitted only to the terminal devices having their specific information registered, the unauthorized transaction by an unauthorized device (such as a device under repair or a device owned by other company having the same function as the device of its own) is prevented.

(b) When the terminal device is seized while it is carried, the contents of the unauthorized use prevention information registration tables in the central unit and the TCE corresponding to the seized terminal device are updated to render the seized terminal device inoperable to the transaction. Accordingly, the unauthorized transaction by the seized or robbed device is prevented.

(c) The injust unauthorized use prevention information as well as the transaction guidance are registered in the unauthorized use prevention information registration table in the central unit, and when the unauthorized use prevention information is to be registered to the terminal device, the transaction guidance is also registered to the terminal device. Accordingly, the range of the transaction of the terminal device may be limited. Thus, by registering only the necessary transaction guidance by management before the terminal device is carried out of the office, depending on the place to which it is carried, a person who carries it and an application thereof, the range of the unauthorized use can be minimized even if the bank solicitor is threatened and forced the just to perform the unauthorized transaction.

(d) The contents of the unauthorized use prevention information registration tables of the central unit and the TCE may be changed every day and the registration of the unauthorized use prevention information to the terminal device is carried out by a specific person such as management other than a person who actually effects the transaction by the terminal device or manages the terminal device. A registration operator is informed of a portion or all of the registration information through a phone or the like and he conveys the content to only the operator who actually effects the transaction. The operator who effects the transaction by the terminal device having its unauthorized use prevention information registered enters the information conveyed by the registration operator when he enters the transaction data and transmits it to the central unit. The central unit and the TCE check to see if the unauthorized use prevention information automatically transmitted from the terminal device and the unauthorized use prevention information entered by the operator are equal to or have a predetermined relation to a portion or all of the unauthorized use prevention information of the unauthorized use prevention information registration tables of the central unit and the TCE corresponding to that terminal device, and if they are not equal or do not have the predetermined relation, the transaction is inhibited. Thus, the unauthorized transaction by the unauthorized use of the terminal device by those who relate to the job is prevented.

In the above embodiment, when the terminal device requests the registration to the central unit, the data read from the magnetic card MC is used. Alternatively, data entered by the keyboard or a data read from a disc storage may be used.

In the above embodiment, the magnetic card data, the registration request data, the registration completion data, the transaction data and the transaction answer data have the data formats shown in FIGS. 6, 7, 8, 9 and 10, respectively. The sequence of the respective blocks may be changed or a portion thereof may be omitted, or another block may be added.

In the above embodiment, when the central unit transmits the unauthorized use prevention information to the TCE and the terminal device, and when the terminal device transmits the unauthorized use prevention information to the TCE and the central unit, the unauthorized use prevention information read from the unauthorized use prevention information registration table or the unauthorized use prevention information buffer memory is transmitted as it is. Alternatively, only a portion of the unauthorized use prevention information may be transmitted for each information, or a portion of one information and all of the other information may be transmitted.

In the above embodiment, the TCE and the central unit carry out the transaction operation when the unauthorized use prevention information transmitted from the terminal device and the unauthorized use prevention information read from the unauthorized use prevention information registration table are equal. Alternatively, the unauthorized use prevention information may be arithmetically or logically operated or combined, and the transaction operation may be permitted if the operation result is a predetermined one.

While the blocks in the TCE and the central unit in the above embodiment are shown as separate circuits, a general purpose computer may be used for the TCE and the central unit so that all blocks need not be provided as separate circuits. For example, the unauthorized use prevention information registration table and the registration flags may be implemented in a main memory of the general purpose computer, and the registration code register, the address registers, the unauthorized use prevention information register and the compare circuit may be attained in an arithmetic logic unit of the general purpose computer.

Similarly, the device control circuit, the MSRW control circuit, the printer control circuit, the display control circuit and the keyboard control circuit, of the portable terminal device may be implemented by a microprocessor.

While various input/output units are provided in the terminal device of the above embodiment, they may be of other types. A portion thereof may be omitted or other units may be added.

While the transaction operation is shared by the central unit in the above embodiment, a portion or all of the functions of the central unit may be carried out by the TCE. For example, when the TCE receives the transaction data from the terminal device, it may compare the unauthorized use prevention information in the transaction data with the injustice prevention information read from the unauthorized use prevention information registration table, and if they are equal, it carries out the transaction operation and prepares the transaction answer data to be transmitted to the terminal device. In this manner, the burden of the central unit is relieved and the telephone lines are saved.

We claim:
1. A transaction handling system comprising:
a terminal control equipment connected to a central unit; and
a terminal device connectable through communication means to said terminal control equipment, including means for inputting transaction data at said terminal device and means for transmitting said transaction data together with an address of said terminal device as a transaction message through said terminal control equipment to said central unit to perform data processing in said central unit with respect to the transaction data in said transaction message;

said terminal device having first means for storing in said terminal device first specific information previously assigned to said terminal device to authorize use of said terminal device and second means connected to said first means and said inputting means for generating a transaction message formed of said first specific information, the transaction data and said address; and said terminal control equipment having third means for storing second specific information previously registered therein at storage locations corresponding to the addresses of said terminal devices to be connected to said terminal control equipment regarding use authorization of said terminal devices, fourth means connected to said third means so that when receiving said transaction message via said communication means from a terminal device, the relation between said fist specific information included in said transaction message and said second specific information read out of said third means according to said address included in said transaction message is being checked by said fourth means, and fifth means responsive to the result of the checking operation by said fourth means for controlling the transmission of said transaction message to said central unit, wherein a terminal device not authorized is prohibited from communicating with said central unit.

2. A transaction handling system according to claim 1, wherein said terminal device is portable and includes means for effecting connection through a telephone system to said terminal control equipment.

3. A transaction handling system according to claim 1, wherein said terminal device includes means for transmitting a request message for registering said terminal device to said terminal control equipment and said terminal control equipment includes sixth means for transmitting a request answer message including said first specific information to said terminal device for storage in said first means therein as an answer to said request message.

4. A transaction handling system according to claim 3, wherein said central unit has seventh means for storing third specific information corresponding to the use authorization of said terminal devices; said terminal control equipment including eighth means responsive to receipt of said request message from said terminal device for sending said request message to said central unit; said central unit including ninth means responsive to said request message for sending to said terminal control equipment an answer message including said third specific information read out of said seventh means and corresponding to said terminal device transmitting said request message; said terminal control equipment including tenth means for storing said third specific information included in said answer message from said central unit into said third means as said second specific information for transmission by said sixth means as part of said request answer message to said terminal device; said terminal device thereby storing said third specific information included in said request answer message into said first means as said first specific information.

5. A transaction handling system according to claim 4, wherein said central unit includes eleventh means for storing whether an answer message in response to said request message corresponding to said terminal device has been sent by said ninth means, and twelfth means responsive to an indication from said eleventh means that said answer message to said request message from said terminal device has not been sent when said central unit receives a transaction message including transaction data from said terminal device through said terminal control equipment for inhibiting data processing said central unit with respect to said transaction data.

6. A transaction handling system according to claim 5, wherein said terminal device is portable and includes means for effecting connection through a telephone system to said terminal control equipment.

7. A transaction handling system according to claim 4, wherein said terminal device is portable and includes means for effecting connection through a telephone system to said terminal control equipment.

* * * * *